(12) United States Patent
Wolff-Petersen et al.

(10) Patent No.: US 9,037,969 B2
(45) Date of Patent: May 19, 2015

(54) SYSTEM AND METHOD FOR DISTRIBUTING USER INTERFACE DEVICE CONFIGURATIONS

(71) Applicant: STEELSERIES ApS, Valby (DK)

(72) Inventors: Jacob Wolff-Petersen, Richmond (GB); Bruce Hawver, Hawthorn Woods, IL (US); Tino Soelberg, Valby (DK)

(73) Assignee: STEELSERIES ApS, Valby (DK)

( * ) Notice: Subject to any disclaimer, the term of this patent is extended or adjusted under 35 U.S.C. 154(b) by 0 days.

(21) Appl. No.: 14/499,861

(22) Filed: Sep. 29, 2014

(65) Prior Publication Data
US 2015/0019993 A1    Jan. 15, 2015

Related U.S. Application Data (63) Continuation of application No. 13/589,432, filed on Aug. 20, 812, now Pat. No. 8,881,008, which is a continuation of application No. 13/048,007, filed on Mar. 15, 2011, now Pat. No. 8,281,046, which is a continuation-in-part of application No. 12/167,342, filed on Jul. 3, 2008, now Pat. No. 7,925,797.

(51) Int. Cl.
*G06F 3/00* (2006.01)
*G06F 3/0482* (2013.01)
*G06F 3/0484* (2013.01)

(52) U.S. Cl.
CPC .......... *G06F 3/0482* (2013.01); *G06F 3/04842* (2013.01)

(58) Field of Classification Search
USPC ............................................. 715/700; 710/8
See application file for complete search history.

(56) References Cited

U.S. PATENT DOCUMENTS

| 6,009,153 | A | 12/1999 | Houghton et al. |
| 6,041,183 | A | 3/2000 | Hayafune |
| 7,146,435 | B2 | 12/2006 | Williams et al. |

(Continued)

FOREIGN PATENT DOCUMENTS

| WO | 2007003181 | 3/2007 |
| WO | 2007139349 | 12/2007 |

OTHER PUBLICATIONS

GUI Mods, "Free Windows Vista Themes and Resources", 2 pages, http://www.guirnods.com/, website last visited Jul. 1, 2008.

(Continued)

*Primary Examiner* — Alan Chen
(74) *Attorney, Agent, or Firm* — Guntin & Gust, PLC; Andrew Gust (57) ABSTRACT

A system that incorporates teachings of the present disclosure may include, for example, a computing device including a memory, a display device and a controller. The controller is programmed to provide to a first server a request for User Interface (UI) device configurations, provide to the first server configuration criteria associated with the request, receive configuration data associated with target UI device configurations from the first server, present a Graphical User Interface (GUI) on the display device based on the configuration data where the GUI displays selections for each of the target UI device configurations, provide a selection from among the selections of the target UI device configurations, and receive provisioning information from the first server that allows for implementing the selection of the target UI device configuration. Other embodiments are disclosed.

20 Claims, 7 Drawing Sheets

(56) References Cited

U.S. PATENT DOCUMENTS

| | | |
|---|---|---|
| 7,743,012 B2 | 6/2010 | Chambers et al. |
| 8,843,853 B1 * | 9/2014 | Smoak et al. .................. 715/839 |
| 2003/0103088 A1 | 6/2003 | Dresti |
| 2004/0048668 A1 | 3/2004 | Brosnan |
| 2005/0138348 A1 | 6/2005 | Bolay |
| 2006/0068911 A1 | 3/2006 | Pirich |
| 2006/0143572 A1 | 6/2006 | Scott |
| 2006/0149809 A1 | 7/2006 | Salo et al. |
| 2006/0156209 A1 * | 7/2006 | Matsuura et al. ............. 714/798 |
| 2007/0271497 A1 | 11/2007 | Novak |
| 2008/0082594 A1 | 4/2008 | Soltes et al. |
| 2008/0165035 A1 | 7/2008 | Bhella et al. |
| 2008/0307454 A1 | 12/2008 | Ahanger |
| 2009/0055759 A1 | 2/2009 | Svendsen |
| 2009/0288022 A1 * | 11/2009 | Almstrand et al. ........... 715/762 |
| 2010/0005196 A1 | 1/2010 | Wolff-Petersen |
| 2011/0021269 A1 | 1/2011 | Wolff-Peterson |
| 2011/0093814 A1 | 4/2011 | Haughawout et al. |
| 2011/0118022 A1 | 5/2011 | Aronzon et al. |
| 2011/0157024 A1 | 6/2011 | Chao |

OTHER PUBLICATIONS

Patent Cooperation Treaty, "International Search Report and Written Opinion", ISAIEP, by Officer Pawel Kusnierczak, in PCT Application No. PCTIIB2009/006551, Jan. 7, 2010.

Themes Unlimited, "Horne of the Best Desktop on the Net", 4 pages, http://www.thernesunlirnited.com/, website last visited Jul. 1, 2008.

* cited by examiner

SYSTEM AND METHOD FOR DISTRIBUTING USER INTERFACE DEVICE CONFIGURATIONS

CROSS-REFERENCE TO RELATED APPLICATIONS

This application is a continuation of U.S. patent application Ser. No. 13/589,432 filed Aug. 20, 2012, which is a continuation of U.S. patent application Ser. No. 13/048,007, filed Mar. 15, 2011, which is a continuation-in-part of U.S. patent application Ser. No. 12/167,342, filed Jul. 3, 2008, now U.S. Pat. No. 7,925,797, and entitled "System and Method for Distributing User Interface Device Configurations," the disclosures of all of which are hereby incorporated by reference in their entirety.

FIELD OF THE DISCLOSURE

The present disclosure relates generally to user interface devices, and more specifically to system and method for distributing user interface device configurations.

BACKGROUND

It can be technically complex and time consuming for users to configure User Interface (UI) devices such as a navigation device (e.g., computer mouse, game controller, etc.), keyboard, display and/or audio system (e.g., a loud speaker system, headset, etc.) for a computing device such as a computer, gaming system, media player, or like device. Additionally, there may be instances where a user may desire to vary UI device configurations between software applications with UI-related features.

DETAILED DESCRIPTION

One or more of the exemplary embodiments described herein provide settings and/or User Interface (UI) device configurations that can be downloaded or otherwise delivered to computing devices. In one embodiment, the settings and configurations can be provided remotely, such as through use of cloud computing. In another embodiment, the selection of configurations can be filtered based on a number of factors, including configuration criteria, such as user location, user environment, time of day and/or parental controls. Other factors can also be utilized in providing the selection of configurations, including user profiles, network load, game type, and so forth. In one embodiment, the use of a peripheral device with the host device, such as a peripheral device that is detected as being coupled with a mobile phone, can be utilized as a factor in determining the configuration that is to be presented as an option and/or provisioned to the requestor. In another embodiment, bilateral programming in the cloud computing can be utilized, such as where matching of settings and configurations based on host device and peripherals is performed to present options and/or provision the requestor.

One embodiment of the exemplary embodiments entails a method including receiving a request from a first computing device for UI device configurations, where the request is received by a first server that is remote from the first computing device, and where the first server is in communication with the first computing device over a network. The method also includes accessing a database comprising a plurality of UI device configurations, selecting a group of UI device configurations from among the plurality of UI device configurations based on operational parameters of the first computing device, obtaining one or more configuration criteria associated with the request, selecting target UI device configurations from among the group of UI device configurations based on the one or more configuration criteria, and providing configuration data associated with the target UI device configurations to the first computing device for presentation of a Graphical User Interface (GUI) that displays selections for each of the target UI device configurations.

Another exemplary embodiment entails a computing device including a memory, a display device, and a controller programmed to provide to a first server a request for UI device configurations, where the first server is remote from the controller, and where the controller is in communication with the first server over a network. The controller can also be programmed to provide to the first server configuration criteria associated with the request, to receive configuration data associated with target UI device configurations from the first server where the target UI device configurations are selected by the first server from among a plurality of UI device configurations that are compatible with the controller based on the provided configuration criteria, to present a GUI on the display device based on the configuration data where the GUI displays selections for each of the target UI device configurations, to provide a selection from among the selections of the target UI device configurations, and to receive provisioning information from the first server that allows for implementing the selection of the target UI device configuration.

Another exemplary embodiment entails a non-transitory computer-readable storage medium comprising computer instructions to receive a request from a computing device for UI device configurations where the request is received by a server that is remote from the computing device and where the server is in communication with the computing device over a network, to select a group of UI device configurations from among the plurality of UI device configurations based on parameters associated with the computing device, to determine if the computing device has a peripheral device operably connected thereto, to select a first UI device configuration from among a plurality of UI device configurations stored in a memory when the computing device has the peripheral device operably connected thereto, to select a second UI device configuration from among the plurality of UI device configurations when the computing device does not have the peripheral device operably connected thereto, and to provide configuration data associated with one of the first or the second UI device configurations to the computing device.

Another exemplary embodiment entails a method including providing UI device configurations from a computing device to a remote server where the UI device configurations are based on at least one of a gaming environment, a gaming time, and a gaming group; providing a request for a target UI device configuration from the computing device to the remote server; receiving at the computing device provisioning information from the remote server where the provisioning information is associated with the target UI device configuration; and provisioning at least one of the computing device and a peripheral device based on the provisioning information where the peripheral device is operably coupled with the computing device.

Figure 1:
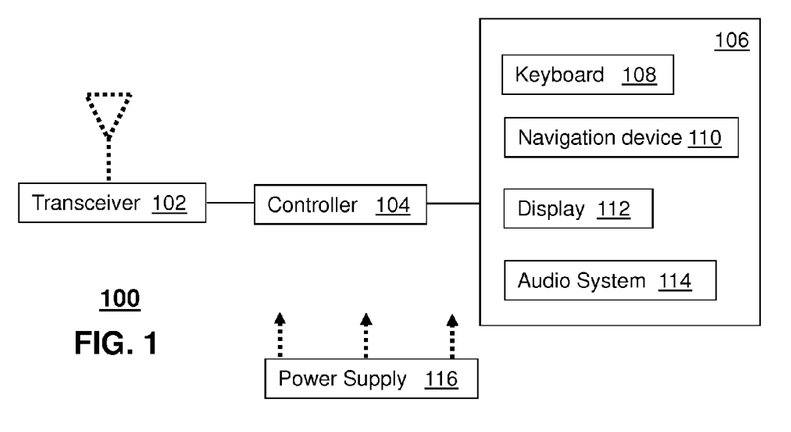
FIG. 1 depicts an illustrative embodiment of a computing device.

FIG. 1 depicts an illustrative embodiment of a computing device 100. The computing device 100 can comprise a wireline or wireless transceiver 102 (herein transceiver 102), a group of UI devices 106, a power supply 116, and a controller 104 for managing operations thereof. The transceiver 102 can utilize common wireless access technologies such as cellular, software defined radio (SDR) and/or WiMAX technologies, among others. Cellular technologies can include, for example, CDMA-1X, UMTS/HSDPA, GSM/GPRS, TDMA/EDGE, EV/DO, and next generation wireless access technologies as they arise.

In another embodiment, the transceiver 102 can support short-range wireless access technologies such as Bluetooth, WiFi, or cordless technologies such as Digital Enhanced Cordless Telecommunications (DECT) or Personal Handyphone System (PHS). In yet another embodiment the transceiver 102 can support wireline technologies such as a Transmission Control Protocol (TCP) operating in conjunction with an Internet Protocol (IP) for exchanging messages in a public Internet network over a Digital Subscriber Line (xDSL) or cable interface.

The group of UI devices 106 can include a depressible or touch-sensitive keyboard (or keypad) 108, a navigation device 110 such as a computer mouse with an optical sensor and/or roller ball, wheel or navigation disk with one or more selection buttons, a game controller or other suitable navigation system for manipulating operations of the computing device 100. The group of UI devices 106 can further include a display 112 such as monochrome or color LCD (Liquid Crystal Display) for conveying images to the end user of the computing device 100. In an embodiment where the display 112 is touch-sensitive, a portion of the keyboard 108 can be presented by way of the display.

The group of UI devices 106 can also include an audio system 114 that utilizes common audio technology for conveying low volume audio (e.g., audio heard only in the proximity of a human ear such as by way of a headset) and high volume audio such as a loud speaker for mono or stereo audio presentations, hands free operation, or other suitable uses. The audio system 114 can further include a microphone for intercepting audible signals of an end user thus enabling voice communications over a common communication network and/or for speech recognition applications. The group of UI devices 106 can in whole or in part be an integral part of a housing assembly of the computing device 100. For example, a portion of the audio system 114 can be a headset with a built-in microphone which couples to a portion of the audio system which is an integral part of the housing assembly of the computing device 100.

The power supply 116 can utilize common power management technologies such as replaceable batteries, supply regulation technologies, and charging system technologies for charging the replaceable batteries and for supplying energy to the aforementioned components of the computing device 100, thereby facilitating portable applications. The power supply 116 can also utilize singly or in combination power management technologies that receive power from a common power outlet and supply regulated energy to the components of the computing device 100. The controller 104 and/or the group of UI devices 106 can utilize computing technologies such as a microprocessor and/or digital signal processor (DSP) with an associated storage memory(ies) such a mass storage device (e.g., hard drive), Flash, ROM, RAM, SRAM, DRAM or other storage technologies. The devices 106 can interact with each other utilizing various arrangements, including a master-slave configuration and/or being a peripheral device for entering user inputs with the controller 104.

The computing device 100 of FIG. 1 can represent without limitation a laptop computer, a desktop computer, a server, a mobile phone (e.g., cell phone), a short-range mobility phone (e.g., a cordless or wired office or home phone), or a gaming system operatively coupled to a communication network for on-line or localized gaming. Other computing device embodiments suitable to the present disclosure are considered within the scope of the claims described below.

In one exemplary embodiment, UI device configurations for one or more of the UI devices 106 can be provided to gamers or other users, including providing the configurations limited to the same gamer and/or exchanging configurations with other gamers. It should be understood that the exemplary embodiments described herein can be utilized in gaming environments and can also be utilized in non-gaming environment with software applications being executed on behalf of other types of users. In another exemplary embodiment, the providing of configurations can be adjusted based on a number of configuration criteria including a location of a gamer, a relationship of the gamer to other gamers, the time of day, the environment of the gamer, and/or parental controls placed over providing the configurations. Each of these configuration criteria can be utilized alone in providing the configurations and/or each of these configuration criteria can be utilized in combination with other factors, such as the described criteria or other factors that have not been described.

In another embodiment, the adjustment to the providing of UI device configurations can utilize one or more of these configuration criteria to select targeted UI device configurations from among a group of UI device configurations that are stored in a memory of the system, which can include a database accessible by a web server. For example, the group of UI device configurations can be provided to the system solely by the gamer who is requesting configurations. In another example, the group of UI device configurations can be provided to the system by the gamer and/or by one or more other gamers, who may or may not be associated with the gamer. Continuing with this example, in one embodiment the group of UI device configurations that are stored in memory can be generated solely based on input from gamers, although other factors can also be utilized.

The present disclosure also contemplates the group of UI device configurations, which are stored in memory, being based on configurations or other information provided by sources other than gamers. For instance, a developer of a game can provide one or more UI device configurations that it believes is optimal for its game. In another example, stored UI device configurations received from gamers can be adjusted by the system to be more compatible with potential configuration criteria, such as the time of day or environment in which it is anticipated the game will be played. For instance, a UI device configuration can be received from a gamer, which results in depiction of violent graphics. This UI device configuration can then be adjusted to depict less violent graphics in accordance with the configuration criteria of parental control, a gamer's age and so forth. The system can store both the original UI device configuration and the adjusted UI device configuration (e.g., a different age-based version) so that the configuration criteria can be applied for selecting among the two potential configurations. In another example, a UI device configuration can be received from a gamer which includes a macro for audibly presenting a message during a game, such as telling another player to "duck." This UI device configuration can then be adjusted to lower the volume of the message or add a graphical indicator to the message in accordance with the configuration criteria of time of day or environmental lighting. The system can store both the original UI device configuration and the adjusted UI device configuration so that the configuration criteria can be applied for selecting among the two potential configurations.

In one embodiment, targeted UI device configurations that have been selected from among a group of UI device configurations that are stored in the memory of the system, can be presented to a requesting gamer for provisioning his or her computing device. The gamer can then select from among the targeted UI device configurations to configure the computing device. Using this exemplary embodiment, the system is able to filter UI device configurations based on one or more configuration criteria so that a list of UI device configuration from which the requesting gamer can choose, are more suited for the requesting gamer's needs, including his or her particular environment. In another embodiment, the system can apply the configuration criteria and operational parameters of the host and/or peripheral device to determine a target UI device configuration and to transmit the provisioning information for the target configuration based on the determination without the need for a selection by the user.

Figure 2:
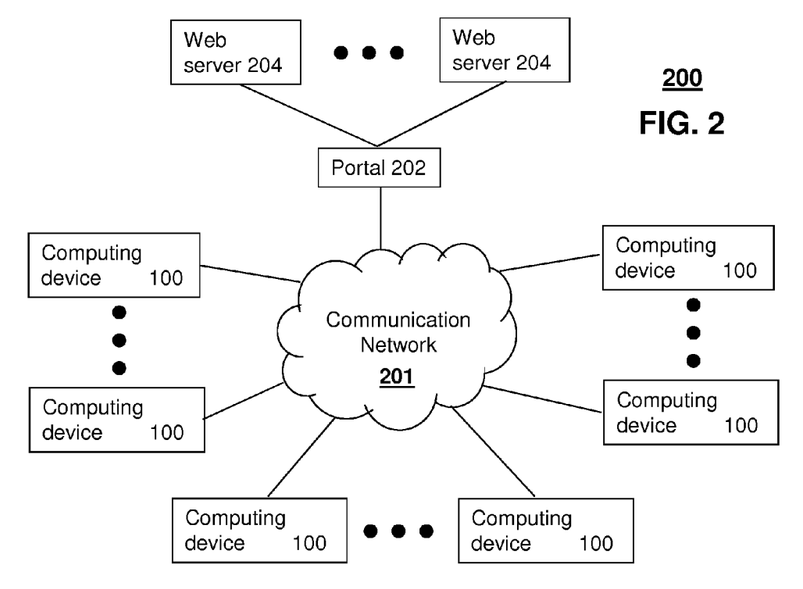
FIG. 2 depicts an illustrative embodiment of a communication system.

FIG. 2 depicts an illustrative embodiment of a communication system 200. The communication system 200 can comprise a portal 202 operating from one or more common web servers 204. The portal 202 can be communicatively coupled to a plurality of computing devices 100 representing any of the aforementioned embodiments of the computing device of FIG. 1. The computing devices 100 can exchange messages with the portal 202 by way of the communication network 201 which can utilize common circuit-switching technology and/or packet-switching technology to support communication sessions therebetween. The circuit-switching or packet-switching technologies can correspond to common wireline or wireless access technologies supportive of the access technologies previously described for the computing device 100 of FIG. 1, as well as combinations thereof.

Figure 3:
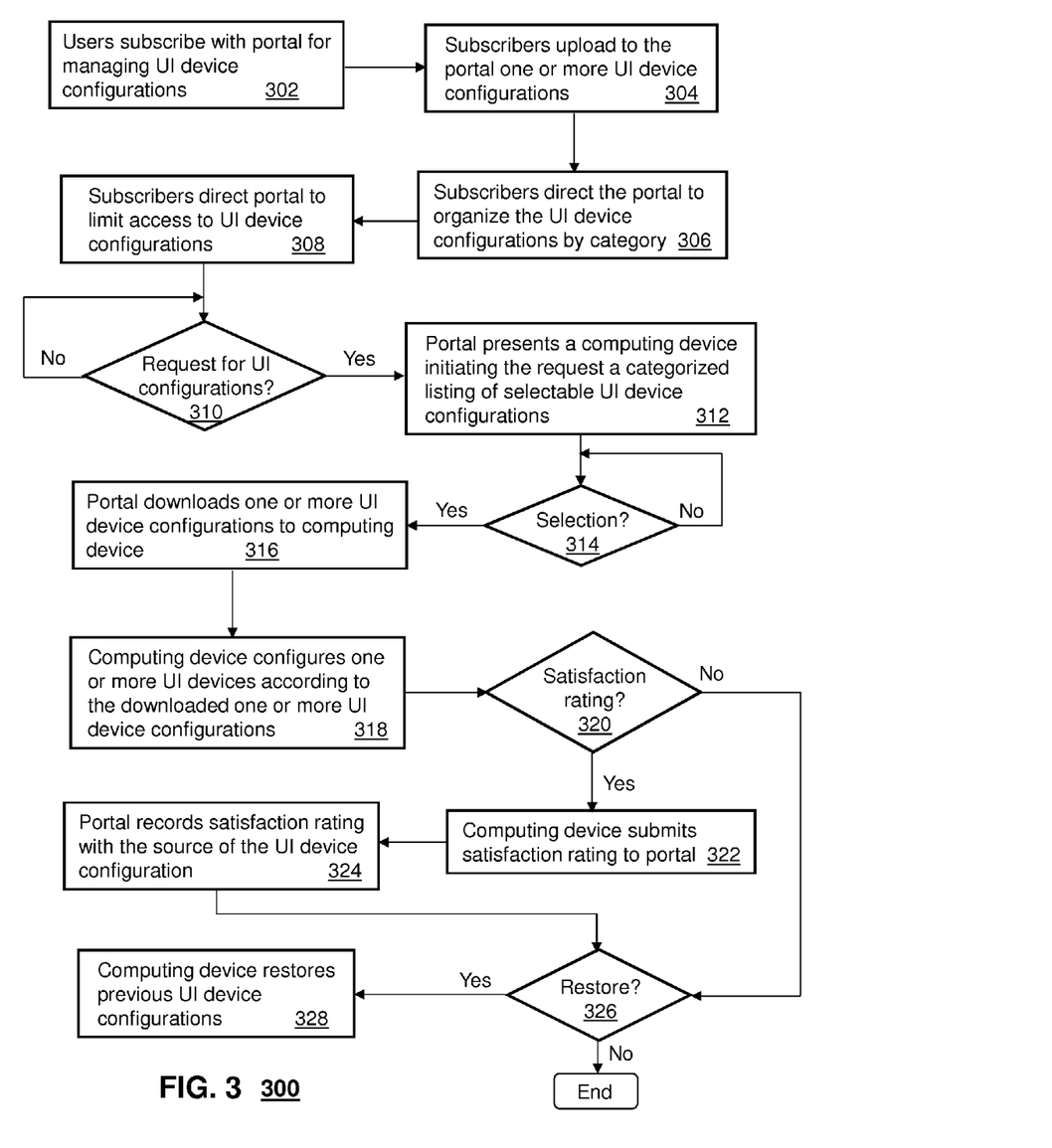
FIG. 3 depicts an illustrative embodiment of a method operating in the communication system of FIG. 2.
Figure 4:
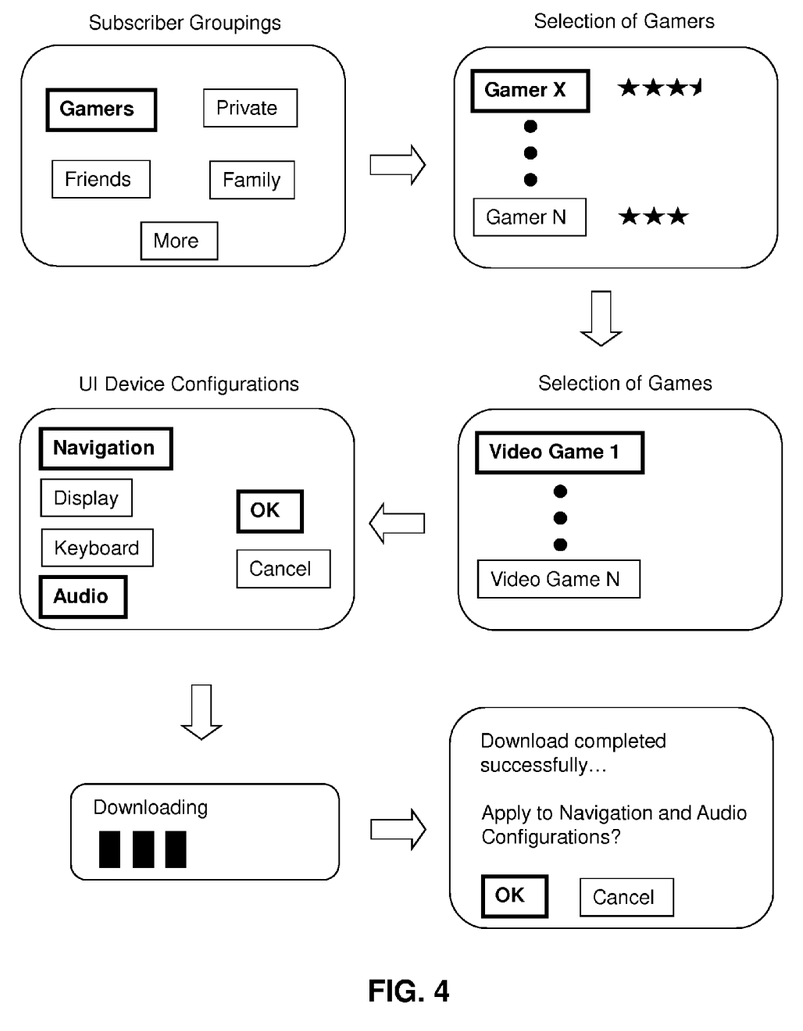
FIG. 4 depicts an embodiment of a graphical user interface illustrative of the method of FIG. 3.

The portal 202 can support the exchange of UI device configurations as described by method 300 of FIG. 3. FIG. 4 depicts an embodiment of a graphical user interface illustrative of method 300.

Method 300 can begin with step 302 in which users of computing devices 100 subscribe to the portal 202 to manage UI device configurations. Each user can access the portal 202 by way of a common Internet browser (e.g., Mozilla Firefox™, Internet Explorer™, etc.). The subscription process can entail a policy in which each prospective subscriber provides contact information (e.g., first and last name, email address, telephone number, etc.). Once a user becomes a subscriber, the portal 202 can assign the user a login name and a password defined by the subscriber or the portal. The services of the portal 202 can be free of charge, at a fee commensurate with the services provided, or in accordance with specific promotions a combination of free services for some subscribers and fee-based services for others.

In step 304, the subscribers can upload to the portal one or more UI device configurations utilized by their computing device 100. In the present context, a UI device can correspond to any device that can serve as a user interface that presents and/or controls in part operations of the computing device 100. Common forms of UI devices can include without limitation a keyboard 108, a navigation device 110, a display 112, or an audio system 114 with any of the embodiments previously described for the computing device 100 of FIG. 1. Method 300 can also be applied to other forms of UI devices not described herein that at the present time or in future generations of computing devices can serve as a user interface.

UI device configurations can take on innumerable embodiments. For example, a keyboard configuration can correspond to one or more character macros created by the subscriber uploading the configurations to the portal. Macros can be useful for reducing time to enter a sequence of characters, or can also be used to reassign keys of the keyboard. For example, a subscriber may find it useful in certain gaming applications to reassign keys (e.g., the number "9" reassigned to the letter "R"). Thus, when a particular game is running the selection of the "R" key produces a character output of "9" as if the "9" key had been depressed. Similarly, the subscriber can create a macro in which two or more keystrokes are generated from a single keystroke. For example, a macro can be created so that when the "F11" key is selected, a sequence of characters can be associated and generated with the selection of this key; for instance, selecting F11 can be designed to produce the character string "Hello". In addition to macros, the subscriber can upload keyboard configurations managed by an operating system (OS) of the computing device. OS-related keyboard configurations can include without limitation a character repeat delay configuration, a character repeat rate configuration, a cursor blink rate configuration, a software driver for the keyboard, or combinations thereof.

A display configuration can correspond to color calibration settings of the display, sharpness settings of the display, refresh rate settings of the display, a desktop configuration, a window appearance configuration, a display resolution configuration, a configuration for a plurality of monitors that expand the desktop capacity of a computing device, a touch-sensitivity configuration for touch-sensitive displays, a software driver for the display, or combinations thereof.

A navigation device configuration can correspond to one or more navigation button configurations, a selection speed configuration for the one or more navigation buttons, a selection lock configuration for the one or more buttons, a pointer selection configuration, a pointer speed configuration, a snap configuration for the pointer, a visibility configuration for the pointer, a configuration for a rotational mechanism of the navigation device, a navigation lift configuration for establishing a bottom surface detection setting of an optical sensor (or similar surface sensor) of the navigation device, an accelerometer configuration, a software driver for the navigation device, or combinations thereof.

An audio system configuration can correspond to a volume configuration, a balance configuration, an audio equalization configuration, a stereo configuration, a noise reduction configuration, a digital audio playback configuration, an audio configuration for actions taken by the navigation device, a configuration of a microphone of the audio system, a multi-dimensional audio settings (e.g., 3 or more dimensions such as a 5.1 audio configuration, 7.1 audio configuration, and so on), a software driver for the audio system, or combinations thereof.

From these illustrative embodiments of UI device configurations, a subscriber of the portal 202 can submit to the portal any portion of the aforementioned configurations or other suitable UI device configurations for archiving purposes. The submission process can take place by way of a software application operating in the computing device 100 which is capable of retrieving UI device configurations from an operating system of the computing device or from another suitable storage location in the computing device or remote to the computing device (e.g., an external local or remote hard drive, remote server, etc.). The software application can be managed by the subscriber (user) of the computing device 100.

In step 306, subscribers can direct the portal 202 by way of a browser of the computing device 100 to organize the UI device configurations. For instance, a portion of subscribers having an interest for gaming may desire to organize their UI device configurations amongst a social network of gamers. Another portion of subscribers may want to create a social network of friends and family. Other subscribers may be less discriminating and choose to share their UI device configurations with any subscriber of the portal 202. Thus, any social and/or organizational hierarchy can be created by the subscribers, and/or a service provider of the portal 202. The subscribers can also establishing in step 308 sharing limitations of the UI device configurations by limiting the community of subscribers that can access their archived UI device configurations.

For example, some subscribers can define a buddy list for exchanging UI device configurations only with subscribers listed in the buddy list. Other subscribers can choose not to share their UI device configurations with any subscribers. Such subscribers can choose to use the portal 202 for private purposes such as for ease of portability between computing devices 100. For instance, if a subscriber changes computing devices 100, said subscriber can access the portal 202 by way of a common browser and download a software application to the computing device 100 to assist the subscriber in the transfer of the subscriber's UI device configurations to the new computing device. Before updating the UI device configurations of the new computing device 100, the software application can store preexisting settings in the event the subscriber wants to restore these setting at some point in time. This feature can be useful in situations where the subscriber desires to transition between computing devices 100 on a temporary basis (e.g., renting or borrowing a computing device). This restoration technique can also be applied to subscribers that share UI device configurations.

Once the UI device configurations have been uploaded and organized with sharing limitations, the portal 202 can monitor requests generated by computing devices 100 of subscribers requesting a presentation in step 312 of available UI device configurations, which can be downloaded and applied to the UI devices of the requesting computing device in steps 316-318 once a selection is detected in step 314. Steps 316-318 can also include a process or recording preexisting UI device configurations before they are changed in the event the subscriber later desires restore them.

FIG. 4 depicts illustrative embodiments of GUI snapshots of portions of steps 312-318. In this illustration a first GUI presented by the computing device 100 of a subscriber depicts subscriber groupings which can be established by the subscriber in step 306 and/or the service provider of the portal 202. In this illustration, the GUI shows groupings for "Gamers", "Friends", "Family", "Private", and others which can be viewed by selecting "More".

The Gamers GUI button can represent a social networking list of subscribers interested in gaming. A Friends or Family GUI button can represent a limited set of subscribers sharing UI device configurations that have been selectively defined in step 306 by a subscriber. The Private GUI button can represent UI device configurations which the subscriber of the portal 202 does not share with other subscribers. In illustration purposes only, it is assumed that the subscriber selects the Gamers GUI button (depicted by the bold font and thicker outline). Responsive to said selection, the portal 202 presents a new GUI with a selection of Gamers. Each gamer can be identified by name or pseudo name and can be assigned an average rating determined from an aggregation of ratings collected by the portal 202 from subscribers associated with the Gamers grouping. The more stars depicted next to a gamer, the higher a rating of satisfaction by subscribers downloading the UI device configurations supplied by the gamer.

In this illustration, the subscriber selects Gamer X perhaps because of a higher satisfaction rating than the other gamers, or because the subscriber likes the particular gamer. This selection transitions to a GUI that lists video games which Gamer X has provided differing UI device configurations. Upon selecting the first video game, the portal 202 presents another GUI with a selection of UI device configurations. Each UI device can be listed separately so that the subscriber can selectively choose the UI devices of interest. In this example, the subscriber chooses the navigation device and the audio system configurations supplied by Gamer X for "Video Game 1".

Upon selecting the OK GUI button, the portal 202 begins to download the navigation device and audio system configurations to the computing device 100 of the subscriber (depicted by the download progress GUI). Once the navigation device and audio system configurations have been successfully downloaded, the subscriber has the option to apply the configurations or reject the update. When the OK button is selected the computing device 100 updates the UI devices per the downloaded configurations and begins operating said UI devices in accordance with these configurations. The update process can be executed by configuration software operating in the computing device by way of its operating system or software downloaded from the portal 202.

It would be apparent to an artisan of ordinary skill in the art that the GUIs depicted in FIG. 4 are illustrative and non-limiting. Said artisan can expect that any GUI arrangement can be used to effectuate steps 312-318. Additionally, it would be apparent to said artisan that the organization of subscribers, and the categorization of UI device configurations can be arranged in other ways while effectuating an end result of updating UI device configurations of a computing device 100 by way of portal 202.

Method 300 can further include steps for rating the UI device configurations downloaded from the portal 202. In step 320, the portal 202 can for example, detect that a subscriber has invoked a process to submit a satisfaction rating using a software application supplied by the portal 202 and operating in the computing device 100 or by way of a browser interface to the portal. The satisfaction rating can be a simple GUI selection of zero to five stars, five stars being the highest level of satisfaction, with half stars also selectable. Once the selection has been made, the portal software operating in the computing device 100 or the browser transmits to the portal 202 the satisfaction rating in step 322, which the portal records in step 324 according to the source of the UI device configuration, which in this illustration, is Gamer X. The portal 202 can use the supplied rating of this subscriber (and others downloading the same or similar UI device configurations of Gamer X) to update the satisfaction rating of Gamer X.

Whether or not a satisfaction rating is provided by the subscriber, the subscriber can be presented by way of portal 202 or portal software operating locally in the computing device 100 an option in step 326 to restore the preexisting UI device configurations. If a restoration option is selected in step 326, the computing device 100 can proceed to step 328 and restore UI device configurations existing before step 318.

Figure 5:
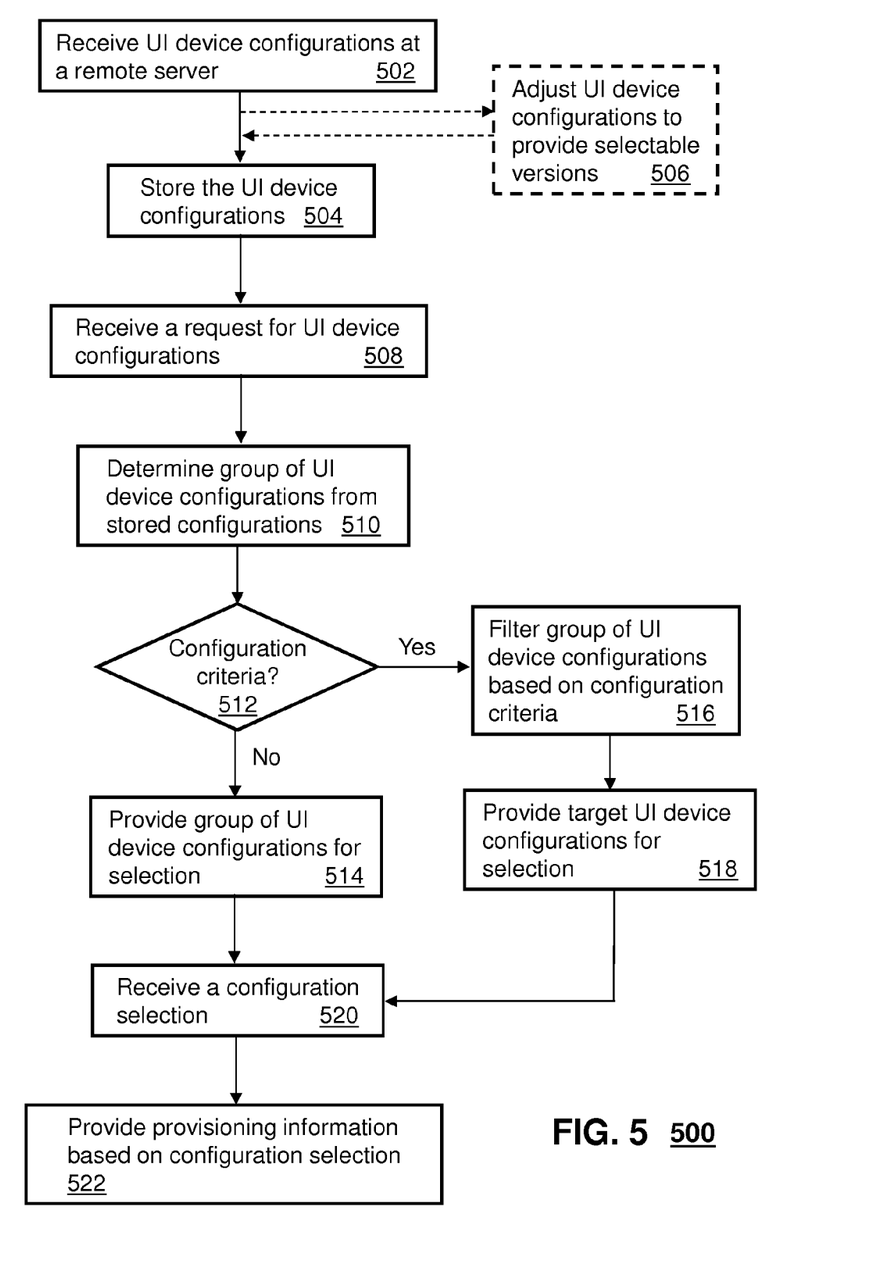
FIG. 5 depicts an illustrative embodiment of a method for provisioning settings and configurations to computing devices and/or peripheral devices.

FIG. 5 illustrates a method 500 of providing UI device configurations to one or more users. Method 500 can be used in the context of video games, but the present disclosure contemplates utilizing the device configuration for other application(s) executed by the computing device(s) 100. Method 500 can begin with step 502 in which UI device configurations are received. The configurations can be received at a remote server or servers, such as web servers 750 shown in FIG. 7. The UI device configurations can be configurations or settings for the computing device 100, peripheral devices connectable with the computing device, and so forth. The configurations can be received from various sources, including a user for his or her own personal use, one or more other users for use by others, including providing of selective access to the use, and other entities, such as software developers that generate configurations for video games or other software applications. In step 504, the received UI device configurations can be stored in a memory that is accessible upon request, such as a database that can be accessed by the web server 750 to satisfy a request for UI device configuration selections.

Figure 7:
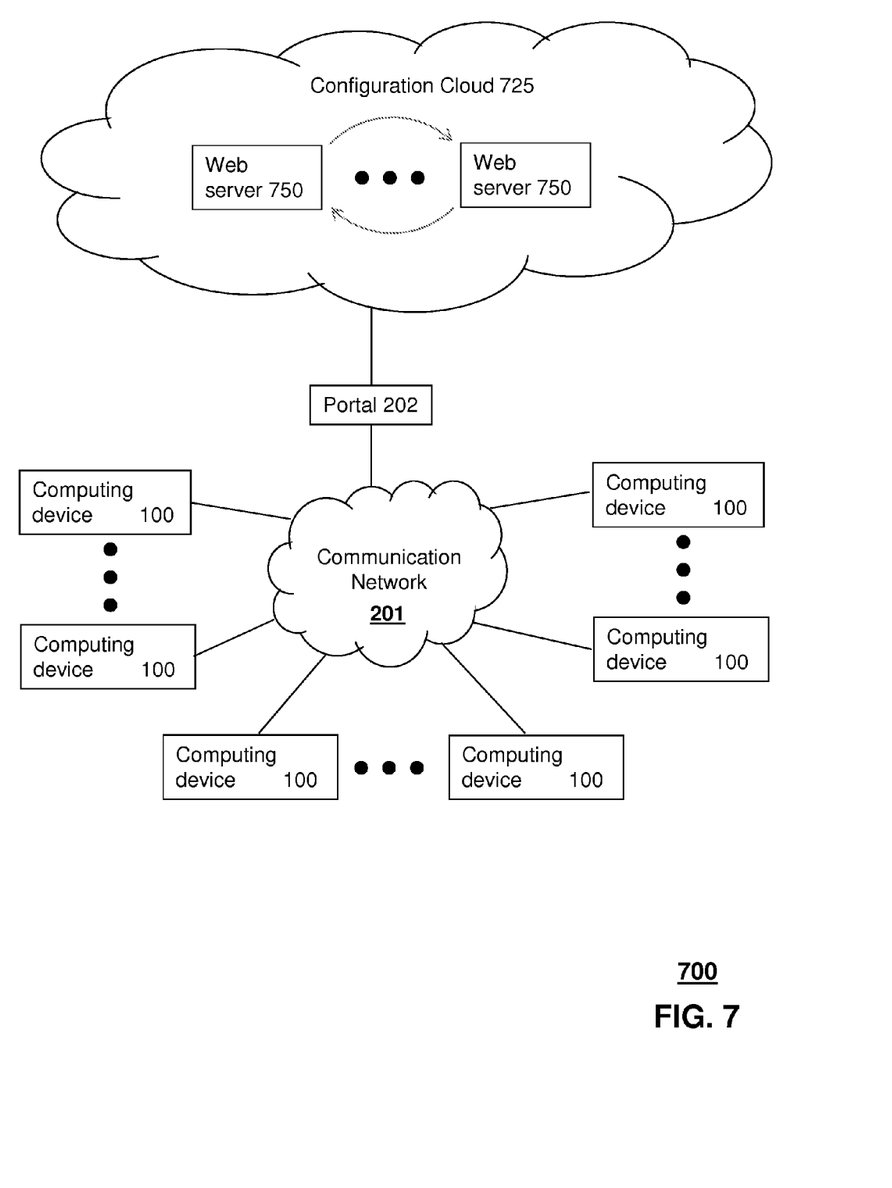
FIG. 7 depicts an illustrative embodiment of another communication system.

In one embodiment in step 506, the received UI device configurations can be adjusted to generate different versions of the received UI device configuration. For example, different versions can be generated so as to be compatible with different host and/or peripheral devices. For instance, a user may provide the web server 750 with a UI device configuration that includes macros usable on an XBOX® controller with a particular game. The web server 750 can then generate a second version of the UI device configuration that includes the same macros but that are usable on a PlayStation® controller with the particular game. The different versions can also be generated based on a number of different factors, such as different versions of UI device configurations for different games, where the configuration is translated to provide for the same result across multiple different games (e.g., a sequence of moves by a game character that may require different inputs across different games).

In another embodiment, the different versions can be generated to accommodate, or otherwise be customized based on, conditions which may be associated with a computing device 100 that later requests the UI device configuration. For example, versions of the UI device configuration can be generated in response to parental controls that seek to reduce violent content. Web server 750 may receive a first UI device configuration that can be used for presenting violent content. The web server 750 can generate a second version of the UI device configuration that can be used to present a limited amount of the violent content which is age appropriate. The web server 750 can generate a third version of the UI device configuration that removes all of the violent content.

Other factors can also be utilized in generating different versions of the UI device configurations. For example, the location of a requesting device can be a factor for adjusting UI device configurations. As another example, the environment and/or time of day of a requesting device can also be a factor, such as whether the viewing area is dark which would require graphics that were brighter. Other graphics, including text, can be adjusted based on the location, such as changing the language of text or the scenery based on the location of a requesting device. Based upon a number of these factors, the web server 750 can generate different versions of the UI device configurations to be stored in memory in step 504 in the event that a requestor associated with the particular factors seeks a UI device configuration. The present disclosure also contemplates these versions being generated after receipt of the request, such as based on information (e.g., configuration criteria) associated with the request.

In step 508, a request for UI device configurations can be received at the web server 750 such as from computing device 100. In response to the request, the web server 750 can determine a group of UI device configurations chosen from among the stored UI device configurations in step 510. It should be understood that the stored configurations can also include configurations located at multiple storage devices, including storage devices of third parties. For example, a request can be received for UI device configurations for playing a particular game using a particular computing device. The web server 750 can search the memory that includes the stored UI device configurations and can determine which, if any, of the stored configurations can be utilized for playing the particular game using the particular computing device. Operational parameters of the host device, peripheral device, display device, network, game being played, and so forth can be among the factors used to determine which, if any, stored configurations are compatible for the request.

In step 512, a determination can be made as to whether there is any configuration criteria associated with the request. Configuration criteria is one or more factors that can be used for filtering the determined group of UI device configurations to generate target UI device configurations that are customized to the user based on the configuration criteria. If there is no configuration criteria associated with the request then method 500 proceeds to step 514 and provides the group of UI device configurations for presentation in a GUI. The GUI can be presented at the requesting computing device 100 and can be presented in various formats. For instance, selectable options for the UI device configurations can be presented, which may or may not include additional information, such as identifying a gamer that donated the configuration, identifying a satisfaction rating associated with the configuration and/or the gamer, identifying a history of selections by the requestor that may be associated with one of the particular configurations, such as whether the requestor has ever utilized other configurations donated by the particular gamer, and so forth. Categories of configurations can be generated by the web server 750 and/or by the requestor, including based on the configuration criteria, social networks, friends, family, satisfaction ratings and so forth.

If, on the other hand, there is configuration criteria associated with the request, then method 500 can proceed to step 516 to filter the determined group of UI device configurations in order to generate target UI device configurations selected from among the group. In step 518, the target UI device configurations can be provided to the computing device 100. The target UI device configurations can be presented in the GUI at the computing device 100 so that the requestor can then select from amongst the target configurations. The target configurations are filtered such that the requestor receives configurations that are better suited to the criteria associated with the requestor, such as the requestor's environment, parental controls, location, friends, family, time of day and so forth.

Figure 6:
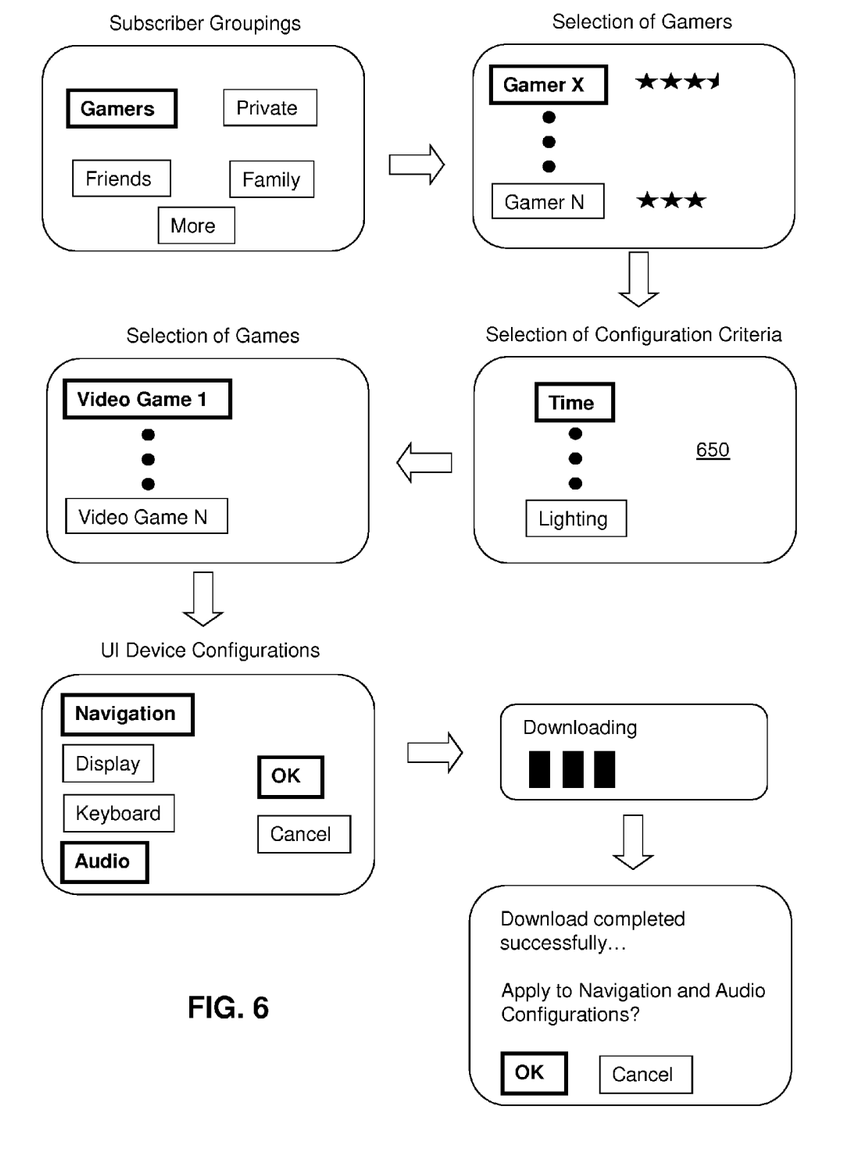
FIG. 6 depicts an embodiment of a graphical user interface illustrative of the method of FIG. 5.

The configuration criteria can be received, or otherwise accessed, in a number of different ways. For example, the requestor can include information in the request that is utilized for the configuration criteria, such as selecting criteria that can be utilized for the filtering of step 516, including a location of the requestor, the time of day, the playing environment, temperature, humidity and so forth. As explained with respect to method 300 and shown in system 700 of FIG. 7, the requestor can access the available UI device configurations through use of the portal 202. For instance, FIG. 6 illustrates a number of GUI windows that can be presented by a computing device 100 and used by a requestor when obtaining UI device configurations. One or more of the GUI windows can include a selection of configuration criteria, such as buttons 650. The buttons 650, or other selection techniques, can be utilized by the requestor to communicate configuration criteria to the web server 750 or otherwise direct the web server to apply criteria for use in the filtering process.

In one embodiment, the buttons 650 can be categories of criteria that are to be utilized by the web server 750 in the filtering process, where the web server can obtain criteria data, such as through querying the requestor's computing device 100, based on the selected category of the criteria. For example, the requestor can select the "time" criteria category from the GUI window and the web server 750 can query the computing device 100 for its local time. In another example, the requestor can select the "lighting" criteria category utilizing buttons 650 and the web server 750 can obtain lighting data associated with the requestor's computing device 100, such as accessing an image obtained by a camera coupled with the computing device 100. The data or other information associated with the selected categories can be obtained with or without the interaction, intervention or assistance of the requestor. For instance, a selection of the "lighting" category from the GUI can result in an image camera of the computing device 100 capturing an image automatically. The image can then be utilized for determining the lighting. In another embodiment, the requestor can provide information through use of the GUI that is utilized alone or with data automatically obtained by the web server 750 from the computing device 100, such as allowing the requestor to input into the GUI whether the room is brightly lit and so forth.

In another embodiment, information associated with the request can be utilized to access configuration criteria, such as an identity of a requestor which is then utilized by the web server 750 to determine that parental controls are applicable to the requestor. In one embodiment, additional information can be obtained that is utilized for selecting the applicable configuration criteria, such as accessing GPS coordinates associated with the computing device, or utilizing the determined location of the computing device to identify the temperature, humidity, time of day, and so forth. In another embodiment, user profiles associated with the requestor can be utilized that provide for configuration criteria.

In step 520, the web server 750 can receive a selection of the UI device configurations that were presented in the GUI. Based on the received selection, the web server can provide provisioning information to the computing device 100 so that the computing device can be configured with the selected UI device configuration.

In one embodiment shown generally in system 700 of FIG. 7, web server 750 can be a plurality of web servers in a configuration cloud 725. The cloud 725 can provide computing devices 100 with UI device configurations such as over network 201 through use of portal 202. Cloud 725 can operate by providing multilateral settings or configurations for various computing devices. For instance, a first web server 750 can provide a host device, such as a desk top computer or a mobile phone, with first settings that are compatible with the host device. A second web server 750 can provide a peripheral device, which is associated with the host device, with second settings (e.g., UI device configurations) that are compatible with the peripheral device and the host device to which the peripheral device is coupled. In this example, the peripheral device can include a processor for utilizing the UI device configurations as described in U.S. patent application Ser. No. 12/509,509 filed on Jul. 27, 2009, entitled "Device for Managing Operations of Accessories", the disclosure of which is hereby incorporated by reference. The first and the second servers 750 can be in communication with each other to coordinate the providing of the settings. For example, the first and second servers 750 can coordinate with each other to determine the group of host device settings and the compatible group of UI device configurations that are to be presented for selection to the requestor. After a selection is made, the provisioning of the host device and the peripheral device can further be coordinated to facilitate delivery of the settings to the host and peripheral devices, including coordinating a communication session for delivery.

In one embodiment, the configuration cloud 725 can perform configuration matching between various web servers 750 to facilitate the presentation of, and/or provisioning of, settings and UI device configurations for host and peripheral devices. In another embodiment, the web servers 750 can be dedicated devices that are associated with different devices and/or groups of devices. For instance, a first web server 750 can be dedicated to presenting and/or provisioning settings associated with XBOX® host devices while a second web server 750 is dedicated to presenting and/or provisioning settings associated with PlayStation® host devices. In another embodiment, the web servers 750 can be dedicated based on the type of software being executed by the host device, such as the operating system, and/or by the type of peripheral device being utilized by the host device, such as joysticks or keyboards. In another embodiment, the presenting and/or provisioning of the settings and UI device configurations can be performed by a plurality of web servers 750, which may or may not be performed in parallel, to facilitate the process. The web servers 750 can communicate directly with each other to facilitate the provisioning process and/or can communicate indirectly with each other, such as through a central server or through other web servers.

In one embodiment, the presentation and/or provisioning of settings and UI device configurations can be based on peripheral devices coupled with the host device. For example, web server 750 can download first settings to a host device when it is detected or otherwise determined that the device, such as a mobile phone, does not have a peripheral device coupled thereto. Web server 750 can download second settings and/or UI device configurations when it is detected or otherwise determined that the mobile phone device has a peripheral device coupled thereto. In this example, the type of peripheral device coupled with the mobile phone host device can be utilized as a factor in the selection of the second settings and/or UI device configurations from among a group of available settings and/or UI device configurations.

From the foregoing descriptions, it would be evident to an artisan with ordinary skill in the art that the aforementioned embodiments can be modified, reduced, or enhanced without departing from the scope and spirit of the claims described below. For example, method 300 can be adapted so that UI device configurations can be archived partially. That is, subscribers can choose to upload or download portions of UI device configurations rather than a full configuration set. In yet another embodiment, method 300 can be adapted so that the service provider of the portal 202 exclusively defines the grouping of subscribers and categories of UI device configurations. This embodiment can be useful in social networks in which an expected behavior or outcome is desired by the service provider of the portal 202.

In one embodiment, the provisioning of settings and UI device configurations can be billed by various means, including number of downloads, periodic subscriptions and so forth. In another embodiment, revenue sharing can be implemented based on the provisioning of settings and UI device configurations. For example, the web server 750 can monitor the number of downloads of a particular UI device configuration that was provided to the web server by a first gamer. The web server 750 can then share collected revenues with the first gamer that are generated as a result of the downloads. Continuing with this example, the web server 750 can employ digital rights management processes or other techniques, such as user authentication, to prevent unauthorized copying of UI device configurations. However, the present disclosure also contemplates one or more exemplary embodiments that do not employ restrictions against further distribution of UI device configurations or settings.

In one embodiment, the configuration criteria can be based on monitored network activities. For example, the web server 750 can detect the load on a portion of the network that the computing device is operating in, and can determine from this load that certain UI device configurations may be more appropriate to a user than other UI device configurations. The more appropriate UI device configurations can be presented to the computing device for selection or can be provisioned to the computing device without further selection being required.

In one embodiment, the configuration cloud 725 can be a centralized system with a controller server (not shown) that communicates with each of the other web servers 750 for provisioning computing devices with the settings and/or UI device configurations. In another embodiment, the configuration cloud 725 can be a distributed system that performs the provisioning through communication directly amongst the web servers 750. Other arrangements are also contemplated by the present disclosure, such as master-slave arrangements between web servers 750 that are associated with host devices and web server that are associated with peripheral devices of the host devices.

The exemplary embodiments describe generating different versions of a user-provided configuration based on various criteria, including version criteria which may or may not be received from the donating user. It should be understood by one of ordinary skill in the art that the different versions of the configuration can be generated at various times. For example, different versions can be generated and stored in a database in anticipation of a request that matches the particular version. In another embodiment, a different version can be generated after receiving a request, such as according to configuration criteria that is associated with the request. A new version can be generated "on-the-fly" by the web server 750 based on the configuration criteria associated with a request and presented as an option and/or provisioned to the requestor. In another embodiment, the newly generated version can then be stored in the database in the event that another request is received that matches the new version of the configuration.

In one embodiment, a user can store UI device configurations at a remote server so that the configurations can be more readily provisioned at a later time. For instance, the user can store UI device configurations associated with one or more of a gaming location, a gaming time and/or gaming participants. If the user begins to play or otherwise access his or her computing device at a corresponding location, corresponding time and/or with corresponding participants, then the UI device configurations can be accessed by the user's computing device. In one embodiment, the access can be automatically performed, such as detecting when a user has entered an Internet café or detecting when the user's friends have begun to play a video game. The configuration data can be used to place restrictions on or otherwise adjust the user interface, such as preventing voice commands at an Internet café.

In another embodiment, the configuration data can be utilized to alter the presentation of the software application, such as a video game. For example, a first peripheral device (e.g., a joystick) having first configuration data can be used to play a video game in a first style, while a second peripheral device (e.g., a keyboard) having second configuration data can be used to play the video game in a second style. The two different styles can be presented differently, such as first and third person views, and so forth.

Other suitable modifications can be applied to the present disclosure. Accordingly, the reader is directed to the claims for a fuller understanding of the breadth and scope of the present disclosure.

Figure 8:
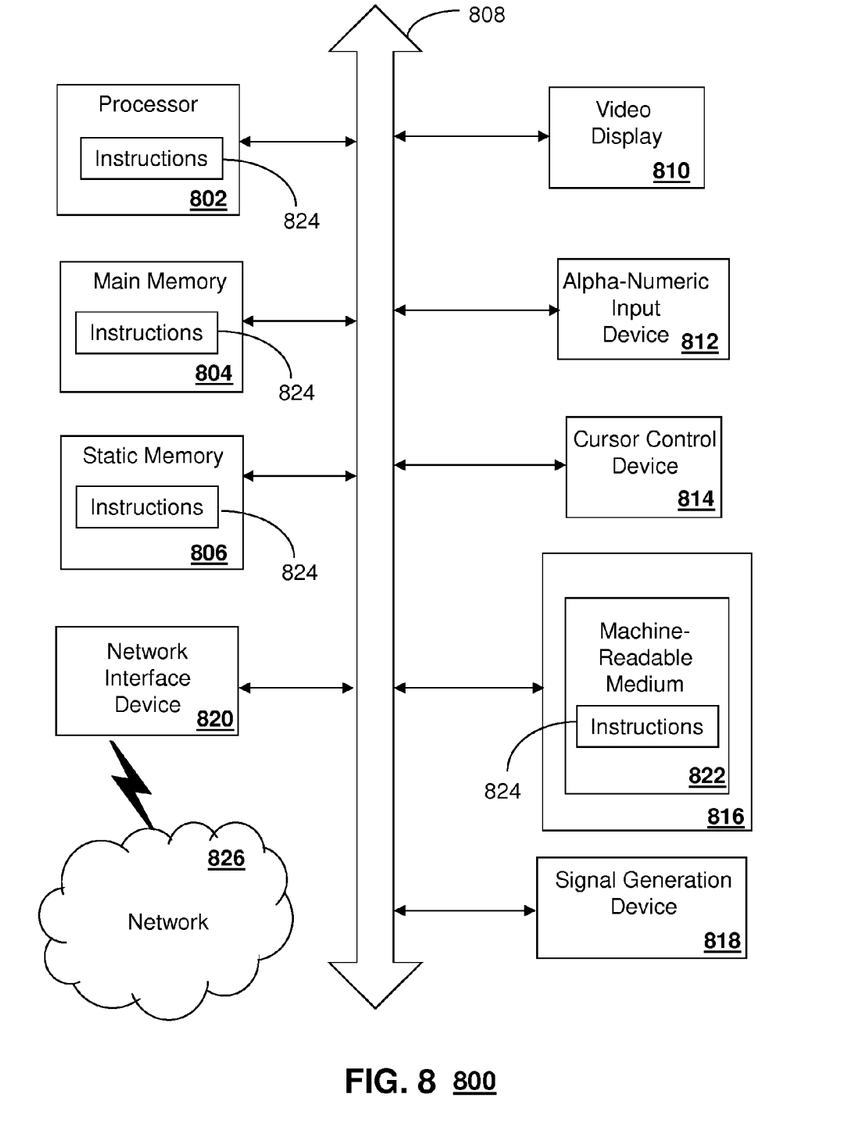
FIG. 8 depicts an illustrative diagrammatic representation of a machine in the form of a computer system within which a set of instructions, when executed, may cause the machine to perform any one or more of the methodologies disclosed herein.

FIG. 8 depicts an exemplary diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, a solid state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a machine-readable medium 822 on which is stored one or more sets of instructions (e.g., software 824) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system comprising:
   a memory storing computer instructions;
   a network interface; and
   a controller circuit coupled with the memory and the network interface, wherein the controller circuit, responsive to executing the computer instructions, performs operations comprising:
      receiving, via the network interface over a network, a configuration request from a first computing device;
      determining location information for the first computing device;
      obtaining configuration criteria according to the location information of the first computing device;
      selecting at least one User Interface (UI) device configuration based on the configuration criteria; and
      providing, via the network interface over the network, configuration data associated with the selected at least one UI device configuration to the first computing device to enable provisioning the first computing device, a first peripheral device coupled with the first computing device, or a combination thereof.

2. The system of claim 1, wherein the providing of the configuration data to the first computing device enables the first computing device to adjust a presentation of a video game being executed by the first computing device.

3. The system of claim 1, wherein the selecting of the at least one UI device configuration is from among a plurality of UI device configurations.

4. The system of claim 3, wherein the operations further comprise receiving, via the network interface over the network, at least some of the plurality of UI device configurations.

5. The system of claim 1, wherein the configuration data is configured for presentation by the first computing device in a Graphical User Interface (GUI) that identifies the selected at least one UI device configuration.

6. The system of claim 1, wherein the operations further comprise:
   receiving a first UI device configuration; and
   modifying the first UI device configuration to generate a second UI device configuration, wherein the selected at least one UI device configuration includes the second UI device configuration.

7. The system of claim 6, wherein the first UI device configuration is received from a second computing device, and wherein the second UI device configuration is generated based on version criteria that is not received from the second computing device.

8. The system of claim 7, wherein the version criteria is at least one of a user environment, brightness, or a time of day.

9. The system of claim 7, wherein the version criteria comprises age-based content ratings.

10. The system of claim 9, wherein the selected at least one UI device configuration is received via the network interface over the network from a second computing device, and wherein the first and second computing devices are associated with a same user.

11. The system of claim 1, wherein the obtaining of the configuration criteria is based on a query to the first computing device for additional criteria information without user intervention.

12. A method comprising:
   providing, by a first computing device comprising a controller circuit, a
   configuration request over a network to a server, wherein the server is remote from the first computing device;
   providing, by the first computing device, configuration criteria associated with the configuration request over the network to the server; and
   receiving, by the first computing device from the server, configuration data associated with at least one target UI device configuration from the server, wherein the at least one target UI device configuration is selected by the server from among a plurality of UI device configurations based on the configuration criteria and based on location information associated with the first computing device.

13. The method of claim 12, wherein the configuration criteria is associated with gaming participants of a video game being executed by the first computing device.

14. The method of claim 12, further comprising:
   presenting a Graphical User Interface (GUI) on a display device based on the configuration data, wherein the GUI displays options for the at least one target UI device configuration; and
   receiving user input of a selection from among the options.

15. The method of claim 14, further comprising:
   communicating with a peripheral device operably coupled with the controller circuit, wherein the peripheral device receives provisioning information stored by the server that enables implementing the selection of the option.

16. The method of claim 15, further comprising adjusting a presentation of a video game being executed by the first computing device based on the provisioning information.

17. The method of claim 12, wherein the configuration criteria is provided by the controller circuit to the server without user intervention.

18. The method of claim 12, wherein the at least one target UI device configuration is uploaded to the server from a second computing device.

19. A computer-readable storage device comprising computer instructions which, responsive to being executed by a controller circuit of a server, cause the controller circuit to perform operations comprising:
   receiving, over a network, a configuration request from a computing device;
   determining location information for the computing device;
   obtaining configuration criteria according to the location information of the computing device;
   selecting at least one User Interface (UI) device configuration based on the configuration criteria;
   providing, over the network, configuration data associated with the selected at least one UI device configuration to the computing device to enable presentation by the computing device of a Graphical User Interface (GUI) that identifies the selected at least one UI device configuration and to enable provisioning of the computing device, a peripheral device coupled with the computing device, or a combination thereof.

20. The computer-readable storage device of claim 19, wherein the selecting of the at least one UI device configuration is from among a plurality of UI device configurations, and wherein at least some of the plurality of UI device configurations are received from a second computing device over the network.

* * * * *